(12) United States Patent
Perraud et al.

(10) Patent No.: US 6,992,568 B2
(45) Date of Patent: Jan. 31, 2006

(54) PASSIVE RESPONSE COMMUNICATION SYSTEM

(75) Inventors: Eric Perraud, Tournefeuille (FR); Michel Burri, Le Grand-Saconnex (CH)

(73) Assignee: Freescale Semiconductor, Inc., Austin, TX (US)

( * ) Notice: Subject to any disclaimer, the term of this patent is extended or adjusted under 35 U.S.C. 154(b) by 86 days.

(21) Appl. No.: 10/228,518

(22) Filed: Aug. 27, 2002

(65) Prior Publication Data

US 2003/0043023 A1     Mar. 6, 2003

(30) Foreign Application Priority Data

Aug. 30, 2001   (EP) ................................. 01402260

(51) Int. Cl.
*H04Q 5/22*  (2006.01)

(52) U.S. Cl. ..................................... 340/10.3; 340/10.4

(58) Field of Classification Search .............. 340/10.3, 340/10.31–10.34, 10.4, 10.41, 10.42, 825.63, 340/825.64; 455/218, 222, 223; 307/10.2
See application file for complete search history.

(56) References Cited

U.S. PATENT DOCUMENTS

| | | | |
|---|---|---|---|
| 3,961,322 A | | 6/1976 | Lichtblau |
| 5,300,922 A | | 4/1994 | Stoffer |
| 5,616,966 A | * | 4/1997 | Fischer et al. ............. 307/10.5 |
| 5,675,609 A | * | 10/1997 | Johnson ....................... 375/237 |
| 5,926,107 A | * | 7/1999 | Glehr ........................ 340/5.61 |
| 6,049,292 A | * | 4/2000 | Einfeldt et al. ............ 340/10.4 |
| 6,100,603 A | * | 8/2000 | Gold ......................... 307/10.2 |
| 6,107,910 A | * | 8/2000 | Nysen ....................... 340/10.1 |
| 6,747,545 B2 | * | 6/2004 | Nowottnick et al. ....... 340/5.61 |

FOREIGN PATENT DOCUMENTS

| | | |
|---|---|---|
| EP | 0105821 B1 | 4/1984 |
| EP | 1001117 B1 | 5/2000 |
| EP | 1041225 B1 | 10/2000 |
| EP | 1077301 B1 | 2/2001 |
| EP | 1288841 A1 | 3/2003 |
| WO | WO90/07760 | 7/1990 |
| WO | WO98/52142 | 11/1998 |
| WO | WO99/05696 | 2/1999 |
| WO | WO99/59284 | 11/1999 |

* cited by examiner

*Primary Examiner*—Michael Horabik
*Assistant Examiner*—Nam Nguyen

(57) ABSTRACT

A method of passive response communication, especially for an access control system, in which a first transponder (2) transmits an interrogation signal to a remote second transponder (3), which responds by transmitting data back to the first transponder (2), the two transponders each comprising a transmitter and a receiver, and a communication signal exchanged between said transponders (2, 3) in at least one direction including a plurality of anti-relay-attack pulses (13, 14). At least one distinguishing pulse (14) selected among the anti-relay-attack pulses has a distinctive shape and the receiver of said communication signal is selectively responsive to the shapes of said plurality of pulses (13, 14). Interception of the transmitted signal in a relay attack using digital transceivers will not relay the distinctive shape and the response of the second transponder is inhibited.

14 Claims, 4 Drawing Sheets

PASSIVE RESPONSE COMMUNICATION SYSTEM

FIELD OF THE INVENTION

This invention relates to a method of passive response communication and a passive response communication system in which a first transponder transmits an interrogation signal to a remote second transponder, which responds by transmitting data back to the first transponder.

BACKGROUND OF THE INVENTION

Passive communication systems are known, for example from international patent application publication number WO 90/07760 (Checkpoint Systems Inc.) and international patent application publication number WO 98/52142 (BTG International Ltd), in which the shape of the pulses is used to help distinguish signals from noise and interference. These systems are tag identification systems, where no particular problem of fraudulent interception is encountered.

A passive communication system is particularly, but not exclusively, applicable to an access control system of the kind including a portable transponder device that identifies the user of the device to a base station by transmitting a coded identification signal to the base station.

The base station may include a mechanism coupled to a door or other closure in order to unlock the door and enable physical entry of the user in response to a valid identification signal received from the portable transponder device, for example; however, the base station may be used alternatively or additionally to perform other types of access control, such as control of the enabling of an operational function, and in particular of starting an engine, or of the disabling of vehicle immobiliser functions, or again of the use of data processing equipment, for example.

The present invention is particularly, but not exclusively, applicable to communication by electromagnetic signals, which expression is to be understood as covering signals in which the magnetic field component is predominant as well as signals in which the magnetic and electric field components are of comparable magnitude.

In some known access control systems, the transponder device is of the active kind, in which an action of the user on the transponder device, such as pressing a button on the transponder device, is required to actuate the transmission of a signal over an electromagnetic transmission path to the base station. The necessity for such a voluntary action by the user is in itself some guarantee against fraudulent access. However, actuation of the device in this way by the user is additional to the actions associated with his primary purpose such as opening a door, starting an engine or starting use of the data processing equipment for example and accordingly is inconvenient.

The present invention relates to a communication system of the so-called 'passive' kind, that is to say of the kind comprising a transponder device capable of transmitting a coded identification signal or other data to the base station without specific action of the user on the transponder device in response to reception of an interrogation signal from the base station. If desired, the transponder device may also be provided with means that may be actuated by a user to trigger transmission to the base station without reception of an interrogation signal from the base station, to unlock access from a greater distance or to command locking, for example, in the case of an access control system. The interrogation by the base station may be triggered by an action of the user related to his primary purpose, such as pulling on a door handle to open a door, for example, and no further action by the user is then necessary to obtain access.

One problem that arises with passive access control systems is to prevent the signals exchanged between the base station and the transponder device being intercepted fraudulently by a 'relay attack'. Thus, in the absence of precautions, when the user leaves the vicinity of the base station, a person could fraudulently trigger an interrogation by the base station, by pulling the handle of a door or actuating a push-button, for example; a first radio relay near to the base station could pick up the interrogation signal and transmit it to a second radio relay positioned by an accomplice near to the user; the second relay could pass the interrogation signal to the transponder device of the user and pick up a response from the transponder device without the user being aware of the interrogation and response; the second relay could then transmit the response to the first relay, which could then pass the response on to the base station.

Various approaches have been proposed to hinder or invalidate the fraudulent interception of communication in this way in passive access control systems, for example in international patent application specification WO 99/59284 and European patent specifications EP 01058214, EP 01041225 and EP 01001117. However, these proposals are not totally effective in making interception impossible, deteriorate the response time of the system and/or add complexity to the system.

SUMMARY OF THE INVENTION

The present invention provides a method of passive response communication, an access control system, a base station and a portable device as defined in the accompanying claims.

DETAILED DESCRIPTION OF THE PREFERRED EMBODIMENTS

Figure 1:
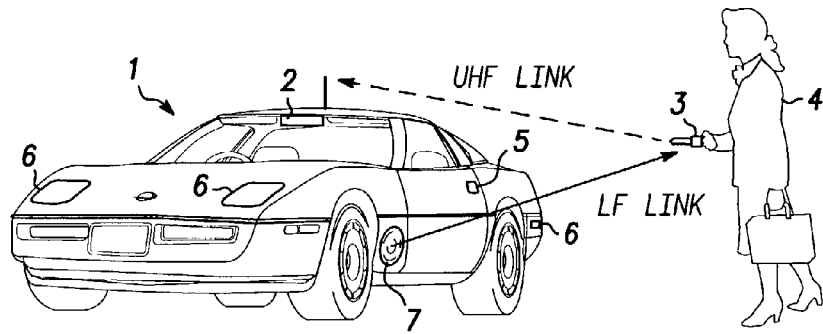
FIG. 1 is a schematic diagram of an access control system for a vehicle in accordance with one embodiment of the invention, in normal use.

The embodiment of the invention shown in FIG. 1 is an access control system for controlling physical access to a vehicle 1 and comprising a base station 2 installed in the vehicle and a portable transponder device 3 that is carried by the user 4 and preferably is integrated into a physical key.

The physical key is usable for unlocking the vehicle, for example in the case of absence of electrical power or for actuating a physical immobiliser on the steering column.

The access control system is of the "RKE"—remote key entry—type, that is to say that the base station 2 controls the unlocking of locks 5 on the doors and other openings of the vehicle 1 by electrical actuators (not shown) in response to reception of a coded identification signal from the transponder device 2. In alternative embodiments of the present invention, the access control system controls disabling of vehicle immobiliser functions instead of, or in addition to, controlling physical entry into the vehicle. The control unit 2 is preferably also connected to actuate briefly lights 6 of the vehicle to confirm performance of the locking and unlocking operations of the vehicle 1.

The control unit 2 comprises a transmitter that will be described in more detail below, operating in the "LF" low frequency range, preferably at 125 kHz, the transmitting antenna 7 being driven to transmit the H field, whose transmitting range is more easily controllable. The base station control unit 2 also includes a receiver (not shown) for receiving signals in the UHF range from the portable transponder 3. The portable transponder 3 includes an LF receiver that will be described in more detail below and a UHF transmitter (not shown).

For the purposes of locking the vehicle 1, the portable transponder device 3 includes a push-button (not shown) that may be actuated by the user 4 to transmit a signal over the UHF link to the base station control unit 2 to command locking of the car. Locking of the car is therefore performed using an active communication method.

For unlocking the vehicle, the base station unit 2 and the portable transponder device 3 normally communicate by a passive response communication method, although the push-button of the portable transponder device 3 may alternatively be used to trigger unlocking of the vehicle, for example from a distance beyond the range of the passive communication.

For passive communication, the access control system includes sensors (not shown) coupled to the door handles 5 of the vehicle and connected to the base station control unit 2 so that, when the user 4 pulls a door handle to open a door of the vehicle 1, a signal is sent from the corresponding sensor to the base station control unit 2. The base station control unit 2 responds to this signal by interrogating the portable transponder device 3, sending, for example, a wake-up signal followed by an interrogation signal, including an encrypted random or pseudo-random number and a base station identification code, followed by an anti-relay-attack field in accordance with this embodiment of the present invention.

In an alternative embodiment of the present invention, it is not necessary for the user 4 to actuate the door handle 5 to unlock the door. The base station 2 repeatedly transmits the interrogation signal and responds to the arrival of the user 4 within range of the LF transmitter and the corresponding reception of the user identification from the portable transponder device 3 to unlock the doors. In this embodiment of the invention, even the locking of the doors does not require any specific action by the user: the base station is connected to sensors (not shown) that respond to the opening and subsequent closure of the doors to transmit the interrogation signal repeatedly. The portable transponder device 3 responds as long as the user 4 is still within range of the LF transmitter and the base station 2 responds to the absence of the response of the portable transponder device 3 when the user 4 has moved out of range of the LF transmitter to lock the vehicle doors. The choice between the two embodiments depends on the preferences of the user 4.

The portable transponder device 3 receives the interrogation signal over the LF link and checks that the interrogation corresponds to a valid interrogation by its corresponding base station. If the interrogation is valid, the portable transponder device 3 responds by transmitting identification data that it has stored in a memory (not shown) over the UHF link to the base station control unit 2, the identification data being encrypted by a suitable method, preferably using the random or pseudo-random number transmitted by the base station control unit. The base station control unit 2 decrypts and checks the identification data transmitted by the portable transponder device 3 and if the identification is valid, enables the unlocking of the locks 5.

Figure 2:
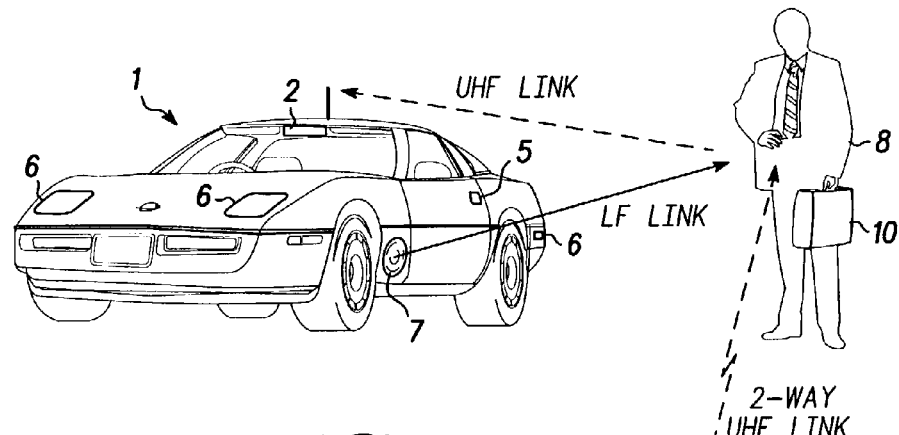
FIG. 2 is a schematic diagram of the access control system of FIG. 1 in attempted fraudulent use.
Figure 2:
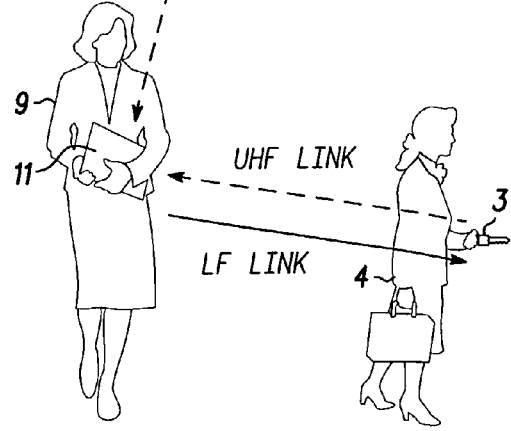

FIG. 1 of the drawings shows the access control system in normal use. However, it is possible for accomplices 8 and 9 to intercept the LF and UHF transmissions by relay attack in an attempt to gain fraudulent access to the vehicle 1 as illustrated in FIG. 2. The first accomplice 8 is equipped with a first relay 10 and the second accomplice is equipped with a second relay 11. The first relay 10 comprises an LF receiver (not shown) capable of receiving signals transmitted by the base station control unit 2, a UHF transmitter (not shown) capable of transmitting signals to the base station control unit 2 and a two-way UHF transmitter/receiver (not shown). The second relay 11 comprises a two-way UHF transmitter/receiver (not shown) for communicating with the first relay 10, an LF transmitter (not shown) for communicating with the portable transponder device 3, and a UHF receiver (not shown) for receiving signals from the portable transponder device 3.

In use, the first accomplice 8 will station himself with the relay 10 at the vehicle 1 after the departure of the proper user 4 and will pull on the door handle in order to trigger generation of an interrogation signal by the base station 2. The base station 2 will transmit the interrogation over the LF link and the relay 10 will receive the broadcast interrogation and re-transmit the received signals over the UHF two-way link to the second relay 11. The second relay 11 will receive the signals from the second relay 11 and re-transmit them over the LF link to the portable transponder device 3, which will check the validity of the interrogation and, if valid, would respond by transmitting the identification data over the UHF link. The identification data would be received by the second relay 11 and re-transmitted over the UHF two-way link to the first relay 10, which would receive and re-transmit the identification data over the UHF link to the base station control unit 2, which would unlock the doors of the vehicle 1 if the identification data were received and validated. The proper user 4 would be unaware of the fraudulent use of the access control system.

The communication method of this embodiment of the present invention includes the anti-relay-attack field to prevent such fraudulent use of the access control system. In the preferred embodiment of the invention this anti-relay-attack field is included in the transmissions from the base station control unit 2 to the portable transponder device 3; however, it would be possible to apply the anti-relay-attack field to transmissions from the portable transponder device 3 to the base station control unit 2 instead, or in addition.

Figure 3:
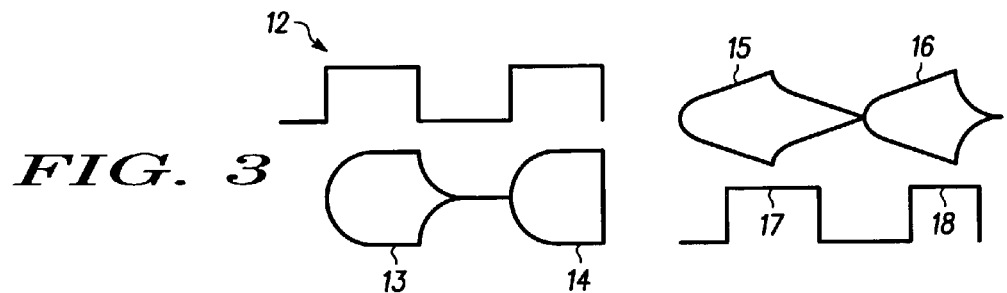
FIG. 3 is a diagram of signals generated by the access control system in normal use as in FIG. 1.

FIG. 3 illustrates signals generated during normal operation of the access control system. The transmitter of the base station control unit 2 generates a train of pulses of rectangular waveform shown at 12. The train of pulses 12 is applied to the output tuned circuit of the transmitter including transmit antenna 7. The time constant or "Q-factor" of the output tuned circuit alters the shape of the pulses transmitted from the antenna as shown at 13 for a normally shaped pulse, with similar rise and fall times of the pulse. The transmitter also includes means (described in more detail below) for producing a short time constant falling edge of one or more selected pulses 14 in the anti-relay-attack field.

At the receiver of the portable transponder device 3, the time constant of the receiver input tuned circuit is added to those of the transmitted signals so that the rise and fall times of the received pulses are prolonged. The rise and fall times of a normally shaped pulse 15 are similar to each other, whereas the rise and fall times of a short falling edge pulse 16 are significantly different. The rectangular waveform signals 17 and 18 detected, as recovered by threshold detection in a typical digital receiver for example, do not enable the differences in rise and fall times to be detected as such. However, the portable transponder device 3 includes means (described below in more detail) that are responsive to the rise and fall times of the received signals, whereby to respond selectively to the shapes of the pulses.

Figure 4:
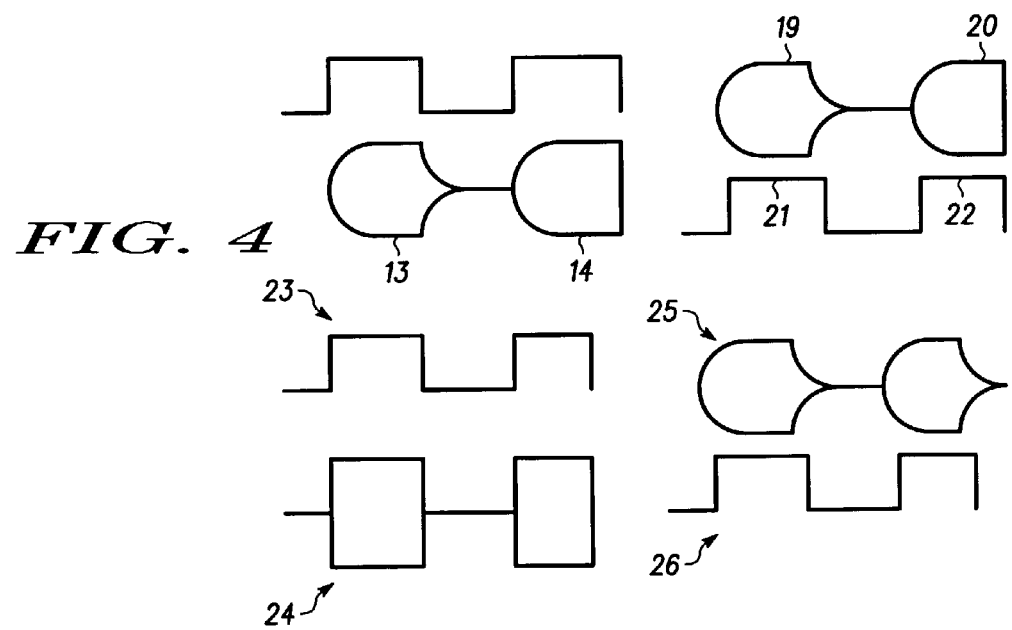
FIG. 4 is a diagram of signals generated by the access control system in attempted fraudulent use as in FIG. 2.

FIG. 4 shows the signals generated in the case of fraudulent interception of the transmitted signals as shown in FIG. 2. Once again, the base station control unit 2 generates the pulses 12 and transmits the pulses 13 and 14. The corresponding signals received at the first relay 10 are shown at 19 and 20, assuming a short time constant at the receiver antenna, which would give the best chance of detection of the different rise and fall times. However, after detection of the received signals, the corresponding pulses 21 and 22 recovered by a threshold detection circuit, for example, are practically indistinguishable from each other. The received pulses are in any case reshaped within the relay as rectangular pulses for transmission over the two-way UHF transmitter/receiver link and the shape of the short falling edge pulse is lost.

The recovered signals 21 and 22 are transmitted to the second relay 11 as shown at 23 and re-transmitted over the LF link to the portable transponder device 3, as shown at 24. None of the signals 25 of the anti-relay-attack field received at the portable transponder device 3 will have different rise and fall times and the pulses will be substantially indistinguishable from each other. Even though the pulses obtained at the portable transponder device 3 after threshold detection as shown at 26 are similar to the pulses 17 and 18 in normal use, since the portable transponder device 3 is capable of detecting that the rise and fall times of all pulses in the anti-relay-attack field are substantially identical, it will detect that the interrogation is invalid and will inhibit response with its identification data.

In order to avoid a more sophisticated interception in which the position of the modified falling edge pulse or pulses is detected and their shape simulated by the relay 11, the position of the modified pulses is selected as a function of a random or pseudo-random number at the base station control unit 2. An additional signal indicating the position of the modified pulse or pulses is encrypted and included in the anti-relay-attack field transmitted from the base station control unit 2 to the portable transponder device. The portable transponder device 3 will inhibit response with the identification data unless the position of the modified falling edge pulses in the anti-relay-attack field corresponds to the position indicated by the encrypted position signal.

The attempted fraudulent usage is shown in the drawings for the case of digital transmitters and receivers. It would be difficult for relays using an analogue transmission link to be used. If the relays have high Q-factor, a substantial delay will be added to the transmissions and can be detected by the base station checking an acknowledge signal which is transmitted back by the portable transponder device. Analogue relays with a low Q-factor are particularly difficult to implement.

Figure 5:
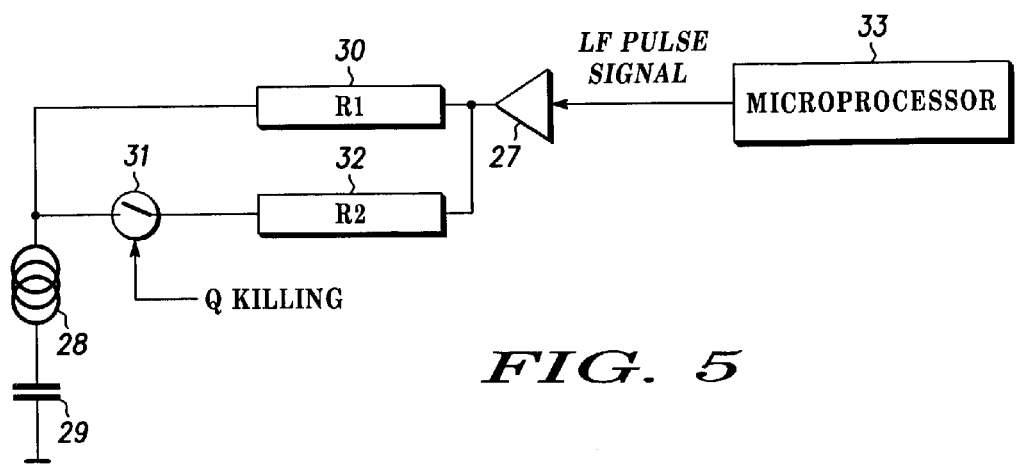
FIG. 5 is a schematic diagram of one embodiment of a transmitter in a base station in the system of FIG. 1.

FIG. 5 shows a preferred embodiment of a transmitter in the base station control unit 2. The transmitter includes an antenna driver amplifier 27 that receives the LF pulsed signal to be transmitted. The amplifier 27 drives a tuned circuit comprising the transmit LF antenna 28 and a tuning capacitor 29 through a high resistance 30 of value R1. A switch 31 is connected in series with a resistance 32 of considerably lower value R2 than the resistance R1, the series combination of switch 31 and resistance 32 being connected to shunt the resistance 30 when the switch 31 is closed. A microprocessor 33 generates the interrogation signals including the anti-relay-attack field and applies the LF signals to be transmitted to the input of the antenna driver 27, selects one or more distinctive pulses 14 and applies a command signal to close the switch 31 temporarily during a few LF cycles at the falling edge of the selected distinguishing pulse or pulses 14.

Figure 6:
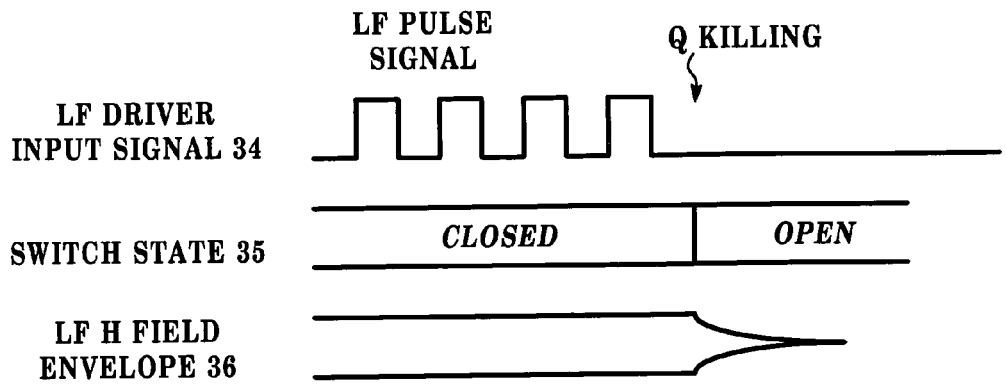
FIG. 6 is a diagram of signals generated by the base station transmitter of FIG. 5.

Referring now to FIG. 6, the LF driver input signal is shown at 34 for an anti-relay-attack pulse 14, the switch 33 closing at the falling edge of the distinctive pulse 14 as shown at 35, the LF magnetic field transmitted decaying thereafter rapidly, as shown at 36.

Figure 7:
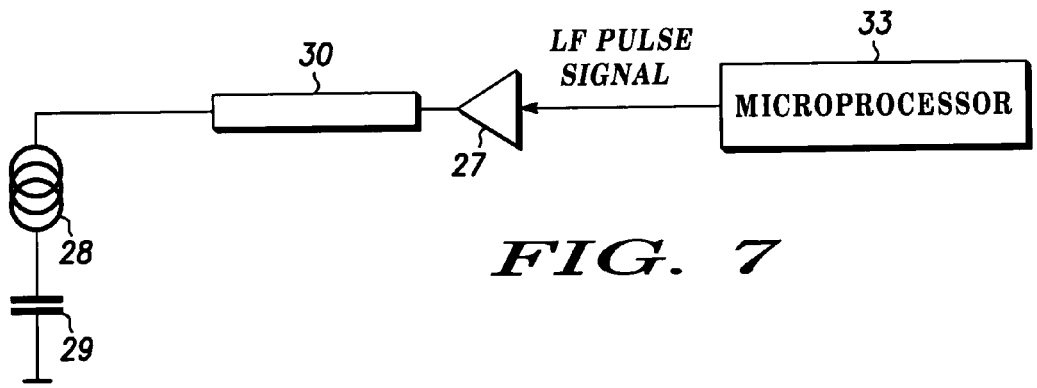
FIG. 7 is a schematic diagram of another embodiment of the transmitter in the base station in the system of FIG. 1.
Figure 8:
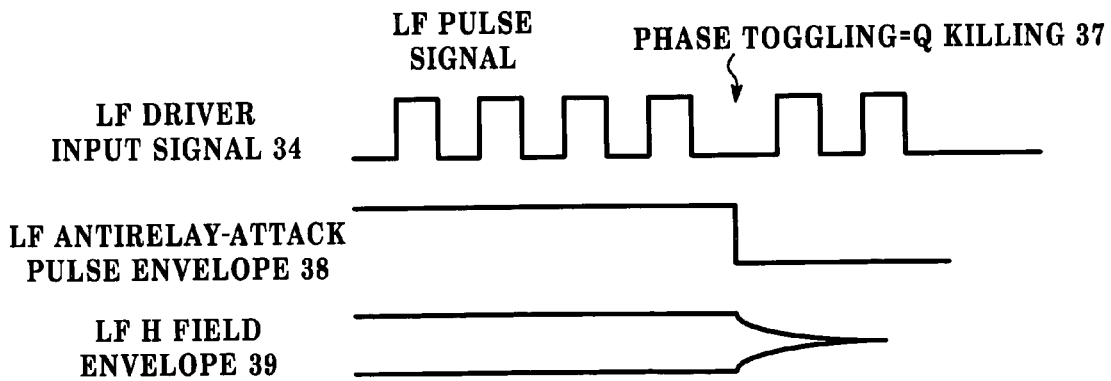
FIG. 8 is a diagram of signals generated by the base station transmitter of FIG. 7.

An alternative embodiment of the transmitter of the base station control unit 2 is shown in FIG. 7. Once again, the antenna driver amplifier 27 supplies the tuned circuit of antenna 28 and capacitor 29 through resistance 30. As shown in FIG. 8, in this case the microprocessor 33 inverts the phase of the driver signal 34 applied to the input of the amplifier 27 temporarily during a few LF cycles after the falling edge 37 of the distinctive pulse 14, shown at 38. The transmitted LF field then decays rapidly as shown at 39.

Figure 9:
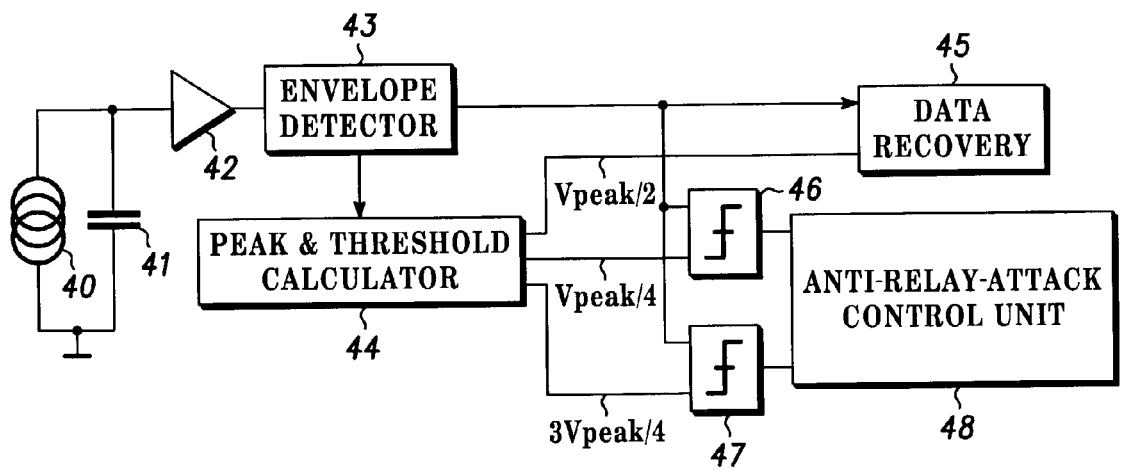
FIG. 9 is a schematic diagram of a receiver in a portable transponder device in the access control system of FIG. 1.

A preferred embodiment of the receiver at the portable transponder device 3 is shown in FIG. 9. An LF tuned circuit comprising a receive antenna 40 and tuning capacitor 41 in parallel is connected to the input of a receiver amplifier 42. The signal from amplifier 42 is fed to an envelope detector 43, which has an output connected to a peak & threshold calculator 44 that measures the peak value of each pulse and calculates threshold definition values at 75%, 50% and 25% of the peak value. Another output of the envelope detector 43 is connected to a data recovery comparator 45 whose other input is connected to the 50% output of the peak & threshold calculator 44.

The receiver also comprises first and second threshold comparators 46 and 47 each having an input connected to the output of the envelope detector 43. The first threshold comparator 46 is also connected to the 25% output of the peak & threshold calculator 44 to provide a binary output when the output of the envelope detector 43 falls below (or rises above, in the case of a rising edge of a pulse) 25% of its peak value and the second threshold comparator 47 is connected to the 75% output of the peak & threshold calculator 44 to provide a binary output when the output of the envelope detector 43 falls below 75% of its peak value (or rises above, in the case of a rising edge of a pulse). The binary outputs from the threshold comparators 46 and 47 are supplied to an anti-relay-attack control unit 48 that measures the time that elapses between the binary signals from the second comparator 47 and the first comparator 46, for example by counting the number of clock pulses between these two events.

It would be possible for the receiver of the anti-relay-attack signals to respond to the absolute values of the fall times of the successive pulses. However it is preferred that the portable transponder device 3 responds to the difference between the rise and fall times of the anti-relay-attack signals pulses. More specifically, in the preferred embodiment of the invention, if dT is the difference between the rise and fall time of a pulse, it is preferred for the portable transponder unit to check the validity of the interrogation by comparing dT for one anti-relay-attack pulse with dT for another anti-relay-attack pulse. Thus, the number of clock pulses between the 75% and 25% levels of the received anti-relay-attack pulses will be subtracted for the rise and fall edges of a given anti-relay-attack pulse and the result of the subtraction compared between different anti-relay-attack pulses. Hence, in responding to the distinctive shape of the anti-relay-attack pulse or pulses selected by the base station control unit 2, the portable transponder device 3 responds to the rate of change of the edges of the received pulses and, more specifically, to the difference in the rate of change of the rising and falling edges of the anti-relay-attack signals. In particular it preferably responds to the variations between the distinguishing pulse and the other anti-relay-attack pulses. These rates of change are sensed by responding to the time elapsed between the moment that an edge reaches a first value and the moment that it reaches a second value, in the present embodiment the first and second values being the 25% and 75% values.

It will be appreciated that the embodiments of the present invention described offer an enhanced security level of the passive response communication without interfering substantially with the response time of the system and without requiring costly complication of the components of the system.

We claim:

1. A method of passive response communication in which first and second transponders exchange electromagnetic communication signals including an interrogation signal, which a first one of said transponders transmits to a second one of said transponders, and a response signal containing data, which said second transponder transmits back to the first transponder in response to said interrogation signal, the two transponders each comprising a transmitter and a receiver for said communication signals, and the communication signal exchanged between said transponders in at least one direction including a plurality of pulses, wherein at least one edge of at least one distinguishing pulse selected among said plurality of pulses has a rate of change different from the rate of change of a corresponding edge of at least another of said plurality of pulses so as to confer a distinctive shape on said distinguishing pulse and the receiver that receives said communication signal is selectively responsive to said distinctive shape.

2. A method as claimed in claim 1, wherein said receiver is selectively responsive to relative values of both rise time and fall time of said plurality of pulses.

3. A method as claimed in claim 1, wherein said receiver is selectively responsive to relative values related to the respective shapes of said at least one distinguishing pulse and at least one other pulse among said plurality of said pulses.

4. A method as claimed in claim 3, wherein said receiver is selectively responsive to relative values of the respective differences between the rise time and fall time of said plurality of pulses.

5. A method as claimed in claim 1, wherein said at least one distinguishing pulse is selected randomly or pseudo-randomly at the transmitter of said communication signal and said communication signal includes an indication of which pulse is said at least one distinguishing pulse, the receiver of said communication signal being selectively responsive to the shape of a pulse corresponding to said indication.

6. A method as claimed in claim 1, wherein said communication signal is an electromagnetic signal and the transmitter of the transponder that transmits said communication signal includes a tuned circuit having a first quality factor and a resistive element that is selectively connected with said tuned circuit whereby to modify said quality factor and differentiate the shapes of said plurality of pulses.

7. A method as claimed in claim 1, wherein the fall time of said at least one distinguishing pulse is shorter than the fall times of the others of said plurality of pulses and the transmitter of said communication signal includes means for inverting the phase of the signal transmitted so as to reduce the fall time of said at least one distinguishing pulse.

8. A method as claimed in claim 1 wherein said interrogation signal is a signal of relatively low frequency and the signal transmitted back to said first transponder is a signal of relatively high frequency.

9. A method of access control comprising communication between first and second transponders by a method as claimed in claim 1, and selectively enabling access in response to said distinctive shape of said distinguishing pulse.

10. An access control system for controlling access by a method including passive response communication as claimed in claim 1, comprising a base station including said first transponder and a portable device including said second transponder, said base station being selectively responsive to reception of said data from said second transponder to enable access.

11. An access control system as claimed in claim 10, wherein said communication signal is transmitted with said at least one distinguishing pulse from said base station to said portable device and said portable device is selectively responsive to the shapes of said plurality of pulses to send said data to said base station.

12. A base station for an access control system as claimed in claim 10 and comprising said first transponder and means for enabling access in response to receipt of said data from said second transponder.

13. A portable device for an access control system as claimed in claim 10 and comprising said second transponder and means for storing said data.

14. A method, of passive response communication in which first and second transponders exchange electromagnetic communication signals including an interrogation signal, which a first one of said transponders transmits to a second one of said transponders, and a response signal containing data, which said second transponder transmits back to the first transponder in response to said interrogation signal, the two transponders each comprising a transmitter and a receiver for said communication signals, and the communication signal exchanged between said transponders in at least one direction including a plurality of pulses, wherein at least one edge of at least one distinguishing pulse selected among said plurality of pulses has a rate of change different from the rate of change of a corresponding edge of at least another of said plurality of pulses so as to confer a distinctive shape on said distinguishing pulse and the receiver that receives said communication signal is selectively responsive to said distinctive shape, wherein the transmitter of the transponder that transmits said communication signal includes a tuned circuit having a first quality factor and a resistive element that is selectively connected with said tuned circuit whereby to modify said quality factor and differentiate the shapes of said plurality of pulses, and wherein the fall time of said at least one distinguishing pulse is shorter than the fall times of the others of said plurality of pulses and said resistive element is selectively connected with said tuned circuit so as to reduce said quality factor at the failing edge of said at least one distinguishing pulse.

* * * * *